(12) United States Patent
Rasse et al.

(10) Patent No.: US 10,723,490 B2
(45) Date of Patent: Jul. 28, 2020

(54) SATELLITE DEORBITING SYSTEM

(71) Applicant: ARIANEGROUP SAS, Paris (FR)

(72) Inventors: Benjamin Rasse, Bordeaux (FR); Patrice Damiano, Toulouse (FR)

(73) Assignee: ARIANEGROUP SAS, Paris (FR)

(*) Notice: Subject to any disclaimer, the term of this patent is extended or adjusted under 35 U.S.C. 154(b) by 481 days.

(21) Appl. No.: 15/548,092

(22) PCT Filed: Feb. 2, 2016

(86) PCT No.: PCT/EP2016/052177
§ 371 (c)(1),
(2) Date: Aug. 1, 2017

(87) PCT Pub. No.: WO2016/124593
PCT Pub. Date: Aug. 11, 2016

(65) Prior Publication Data
US 2018/0022476 A1 Jan. 25, 2018

(30) Foreign Application Priority Data
Feb. 3, 2015 (FR) ...................................... 15 50828

(51) Int. Cl.
*B64G 1/24* (2006.01)
*B64G 1/34* (2006.01)
*B64G 1/62* (2006.01)
*B64G 1/22* (2006.01)

(52) U.S. Cl.
CPC .............. *B64G 1/62* (2013.01); *B64G 1/222* (2013.01); *B64G 1/242* (2013.01); *B64G 1/34* (2013.01)

(58) Field of Classification Search
CPC .......... B64G 1/222; B64G 1/242; B64G 1/34; B64G 1/62
See application file for complete search history.

(56) References Cited

U.S. PATENT DOCUMENTS

| 3,635,425 A | 1/1972 | Swet | |
|---|---|---|---|
| 5,669,586 A * | 9/1997 | Tadros | ..................... B64G 1/24 244/167 |
| 2009/0218448 A1* | 9/2009 | Peypoudat | ............. B64G 1/242 244/158.7 |

FOREIGN PATENT DOCUMENTS

| EP | 0 716 365 A2 | 6/1996 |
|---|---|---|
| FR | 2 897 842 A1 | 8/2007 |
| FR | 2 897 843 A1 | 8/2007 |
| GB | 2 122 965 A | 1/1984 |
| WO | 02/02402 A1 | 1/2002 |

* cited by examiner

*Primary Examiner* — Philip J Bonzell
*Assistant Examiner* — Tye William Abell
(74) *Attorney, Agent, or Firm* — Im IP Law; Chai Im; C. Andrew Im

(57) ABSTRACT

A device to stabilize and deorbit a satellite includes a pair of coplanar masts, each one carrying at least one membrane forming an aerobraking web. The masts are fixed to the satellite along non-parallel axes. Each mast is provided on the opposite end of the satellite with a mass to generate a gravity gradient. The end of each mast is fixed to the satellite. The masts form, with the bisectrix between the masts, a fixed angle to align the bisectrix with the satellite speed vector at any altitude.

7 Claims, 5 Drawing Sheets

SATELLITE DEORBITING SYSTEM

RELATED APPLICATIONS

This application is a § 371 application from PCT/EP2016/052177 filed Feb. 2, 2016, which claims priority from French Patent Application No. 15 50828 filed Feb. 3, 2015, each of which is incorporated herein by reference in its entirety.

FIELD OF THE INVENTION

The present invention is situated in the field of aerobraking structures for deorbiting satellites and provides a system for this purpose.

In the satellite field there exist more and more regulations or rules of good practice that require operators to eliminate their satellites from their orbit after their end of operational life, planned or accidental end of life.

The present invention concerns more particularly satellites in so-called low Earth orbit, below 2000 km, for which after their end of life the satellites must be either deorbited or sent into a so-called "cemetery" orbit above 2000 km. This operation must moreover be effected in less than 25 years.

Technological Background

At present no satellite is able to meet this requirement without carrying on board a dedicated deorbiting system of high mass or without using a large fraction (approximately 30%) of the onboard hydrazine to move the satellite into deorbiting position.

Among the various solutions possible for the deorbiting operations there have been proposed aerobraking sails, i.e. surfaces that use the residual atmosphere present in low Earth orbit as an aerodynamic brake to brake and to slow an object, and thus in the end to reduce the altitude of its orbit.

This type of solution is dedicated to the operation of deorbiting the satellites.

These surfaces utilize ultra lightweight structures, spider web structures or "gossamer" structures well known in the aerospace industry.

The aerobraking principle is described for example in the documents FR 2 897 842 A1 which relates to the principle of deorbiting by means of an aerobraking structure and describes a satellite including two masts each carrying a pair of panels forming an aerobraking sail and FR 2 897 843 A1 which describes a technological solution for the production of such a sail. The above two documents emphasize the relationship between the efficacy of the aerobraking structure and the stability of the satellite and propose solutions for preserving effective aerobraking despite the instability of the satellite, which sometimes leads to overrating the aerobraking structure and therefore weighs on the mass balance of the satellite.

The problem arises because after deploying the deorbiting sail it is no longer possible to maintain the satellite active throughout the duration of its deorbiting, both for economic reasons (controlling a satellite that is not performing its function for periods up to 25 years is not economically viable) and for technical reasons (at end of life there is no longer any propulsion or control energy available on board).

To the contrary, the rule is to "passivate" a satellite that has completed its mission, i.e. to eliminate any energy source liable to react suddenly, and thus in particular the batteries are drained and the propellant tanks are drained, the inertia wheels are stopped, . . . ; this is in order to limit a risk of creating debris in orbit in the event of an explosion.

In the end, the attitude of the satellite is no longer controlled by the attitude and orbit control system (AOCS) and there is nothing to prevent the satellite from rotating on itself.

The attitude of the satellite during the deorbiting phase is critical, however, because it conditions the aerodynamic braking area.

In the field of deorbiting sails, two approaches are then considered:

An isotropic approach. The deployed surface has exactly the same aerodynamic area whatever the attitude of the satellite, for example: deployment of a sphere 1 as in FIG. 1 or taking into account a mean aerodynamic area following Monte-Carlo analysis of the attitude of the satellite.

An approach considering a preferred attitude stabilized by passive means, by aerodynamic forces, gravity or otherwise. For example, the satellite can be stabilized by passive means by the relative positions of the center of mass and the center of application of the braking force (center of mass and braking center aligned with the velocity vector), as in the case of the satellite 101 from FIG. 2 for which a disk-shaped sail 2 is deployed.

Using the first approach, the ratio of the effective aerodynamic area to the deployed area is not the optimum because in order to obtain a sufficient braking area it is necessary to deploy a larger area, often in three dimensions (and therefore more complex), for example spheres or complex shapes such as those indicated in FR 2 897 842 A1

Using the second approach, the optimum position at high altitude is difficult to stabilize by merely positioning the aerodynamic focus to the rear of the center of mass and in alignment with the velocity vector. In fact, the residual pressure becomes very low as the distance from the Earth increases and the aerodynamic forces become minor compared to the disturbing forces (gravity gradient, solar pressure, magnetic torque, deformation of the sail, satellite spin).

Thus at high altitude the attitude of the satellite can be considerably modified and cannot be stabilized by aerodynamic braking; the aerobraking sail can no longer be retained in the optimum position for that braking and lacking any other device the effectiveness of the aerobraking sail decreases significantly.

The atmospheric density has been modeled and there are available for calculations standard or empirical models of the (high and low) atmosphere such as the NRLMSISE-00 model from the USA Naval Research Laboratory, the CIRA model from COSPAR (Committee on Space Research) or the Jacchia model (L. G. Jacchia, Smithsonian Astrophysical Observatory Special Report No 375, 1977).

Using the above models, it is possible by utilizing appropriate tools, such as the STELLA tool from ONES, to calculate and to predict the deorbiting of a satellite as a function of its initial altitude and more generally its initial orbital parameters, its mass and its effective area (that which makes a contribution).

FIG. 3 shows one example of a deorbiting curve for a 285 kg satellite with a constant mean area of 5 m$^2$ from a quasi-circular orbit at an altitude slightly above 700 km.

Deorbiting is produced in around 30 years, with the reduction of altitude accelerating at the time of solar activity peaks.

However, this Figure also shows that the longest duration of passive deorbiting occurs at an altitude greater than approximately 600 km, which reflects the fact that above that altitude the residual atmosphere is truly very tenuous.

It is in fact very important to maximize the mass efficacy of the deorbiting sail above that altitude and to this end to ensure a stable attitude of the satellite making it possible for the surface of the sail to be at all times as perpendicular as possible to the tangent to the trajectory, despite the lack of efficacy of aerodynamic braking in relation to this stability.

It is to be noted that this requirement for efficacy of the sail applies at all altitudes and therefore also at lower altitude, but it is then possible to rely on aerodynamic forces to ensure a stable and optimized attitude of the satellite: in fact the optimum attitude of a satellite in relation to deorbiting is the same at all altitudes, because it is a question of maintaining the sail as perpendicular as possible to the "wind" and therefore to the tangent to the trajectory.

It is moreover known to stabilize a satellite by means of a gravity gradient. This well-known technology is based on a physical phenomenon that explains why the Moon always has the same side facing the Earth.

This stabilization stems from the fact that when an object in orbit around the Earth does not have a homogeneous density it is subjected to a restoring torque because of the variation of the gravitational field that tends to orient it so that its most dense part is closest to the Earth.

This effect has been used to stabilize satellites in their orbit, for example by adding to them a beam at the end of which a mass is placed. If the system is well designed, the satellite S tends to balance itself with the beam P positioned in a direction passing through the center of the Earth, the satellite being closest to the Earth and the mass M on the opposite side as shown in FIG. 4.

Of course, the real situation is slightly more complex and there are stability problems. It is possible to control those problems in particular by the appropriate choice of the length of the beam and the mass placed at its end, depending on the mass and the orbit of the satellite.

OBJECT AND SUMMARY OF THE INVENTION

The objective of the present invention is passive stabilization of a satellite including two masts carrying panels forming an aerobraking sail, notably above but also below 650 km altitude, after the deployment of an aerobraking sail of this kind in a preferred attitude making it possible to optimize the ratio of the effective aerodynamic area to the deployed area and thus to maximize the aerodynamic braking at any altitude so as to reduce the altitude of the satellite significantly without consumption of energy. In this context, the invention consists in combining gravity gradient stabilization at high altitudes and aerodynamic stabilization at lower altitudes, the two methods making it possible to maintain an identical attitude of the satellite whatever its altitude.

To this end, the invention proposes a device for stabilizing and deorbiting a satellite that comprises a pair of coplanar masts each carrying at least one membrane forming an aerobraking sail, said masts being fixed to the satellite along non-parallel axes and each being provided, on the opposite end thereof to the end thereof fixed to the satellite, with a mass for generating a gravity gradient and for which the masts form, with the bisectrix between the masts, a fixed angle adapted to align the bisectrix with the satellite velocity vector at any altitude.

Each of the masts preferably carries two membranes in the form of a panels disposed in a V to form the aerobraking sails.

The panels are advantageously rectangular, one of their longer sides being fixed to the mast.

According to one particular embodiment, the panels on the same mast have an angle between them of 70 to 110°.

The V advantageously has the same orientation for the two masts.

According to one advantageous embodiment, the bisectrix between the two masts carrying sails is an axis of the principal system of axes of the inertia matrix of the satellite and for which the inertia $I_z$ along said bisectrix is between the inertia values on the other two axes of the principal system of axes.

The invention further proposes a method of sizing masts, determining the mast end masses and the angle between the masts and the bisectrix of the masts of a satellite including the steps of:

determination by means of trajectory calculation tools of a minimum effective aerobraking sail area necessary and sufficient to enable the deorbiting of the satellite in a chosen time;

division of that area so determined across two coplanar masts of length L with an angle $2\alpha$ between them;

placement at the end of each mast of a mass m;

positioning the pair of masts at an arbitrary location on the satellite;

choosing a satellite system of axes such that its axis Z is the bisectrix of the angle between the two masts;

calculation of the inertia matrix of the satellite followed by diagonalization of that matrix;

reproduction of the approach by successive iterations that vary the location for installation of the masts, their length, the masses m and the angle $\alpha$, so that:

a—the axis Z of the satellite principal system of axes is also the bisectrix of the masts;

b—the inertia $I_z$ on that axis in that system of axes has an intermediate value $I_{intermediate}$ between a value $I_{minimum}$ and a value $I_{maximum}$ on the other two axes of said system of axes;

choosing the values of the masses, the lengths of the masts and the angle $\alpha$ that make it possible to minimize the total mass of the sails whilst ensuring some robustness of the solution, i.e. that small variations of the parameters around the values adopted do not change the attitudes of the satellite with its sails.

BRIEF DESCRIPTION OF THE DRAWINGS

Other features and advantages of the invention will become apparent on reading the following description of one nonlimiting embodiment of the invention given with reference to the drawings, which show.

DETAILED DESCRIPTION OF EMBODIMENTS OF THE INVENTION

The problem that the invention proposes to solve is that the satellite has to have a stable position that at high altitude enables the largest possible aerobraking area in the plane perpendicular to the axis of the trajectory of the satellite.

Figure 1:
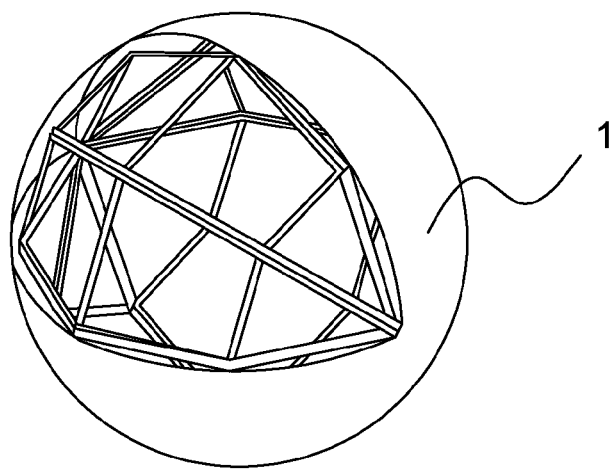
FIG. 1: a first example of a prior art spherical aerobraking structure.
Figure 2:
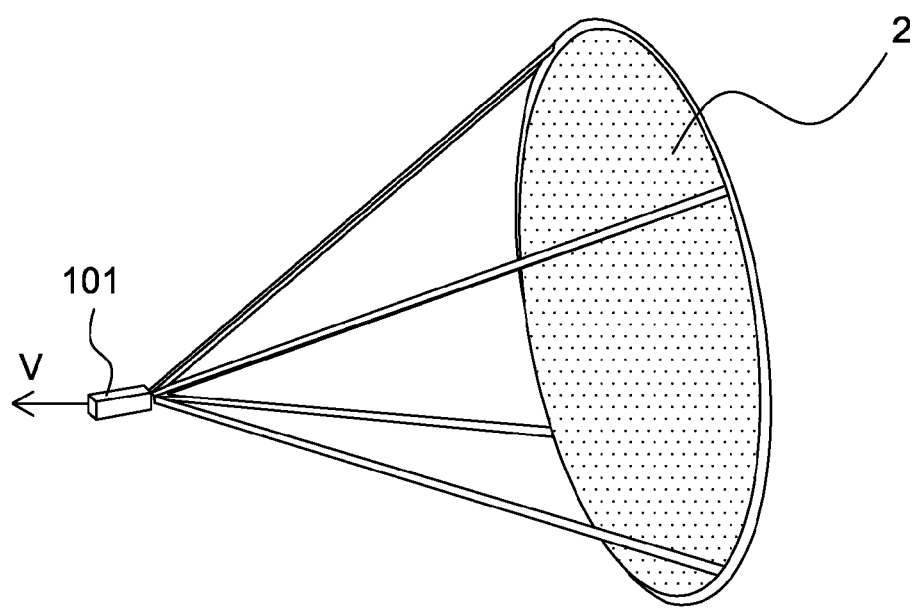
FIG. 2: a second example of a prior art aerobraking structure.
Figure 3:
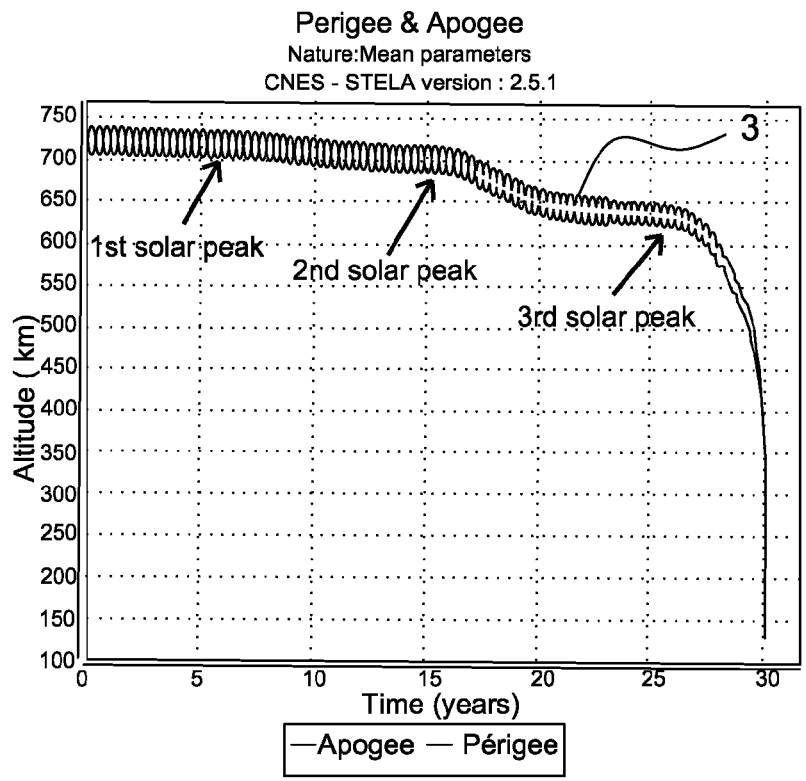
FIG. 3: a typical deorbiting curve.
Figure 4:
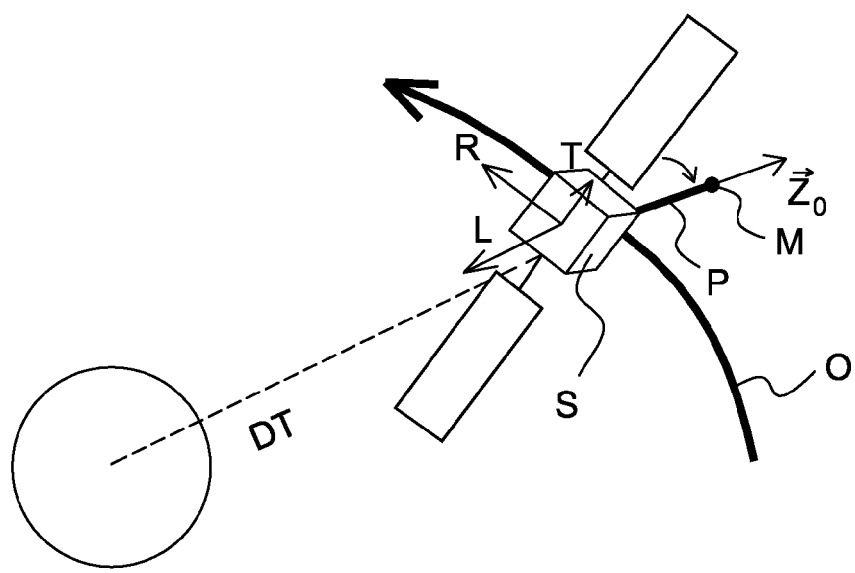
FIG. 4: a diagram showing the gravity gradient principle applied to a satellite.

The operating principle of the device of the invention is based on the gravity gradient as shown diagrammatically in FIG. 4 for a satellite S provided with a mast at the end of which is a mass M and in an orbit O at a distance DT from the center of the Earth.

To understand the various embodiments of the invention, it is appropriate to define three systems of axes:

A system of axes linked to the orbit of the satellite, termed the "local orbital system of axes" at the center of mass of the satellite;

A first system of axes linked to the satellite, termed the "satellite system of axes", used to describe the geometry of the satellite and its properties, also at the center of mass of the satellite;

A second system of axes linked to the satellite, termed the "satellite principal system of axes", again at the center of mass of the satellite.

FIG. 4 shows the local orbital system of axes, which includes:

The axis L, which connects the center of the Earth to the center of mass of the satellite (yaw of the satellite is relative to this axis).

The axis R, tangential to the trajectory of the satellite (roll of the satellite is relative to this axis).

The axis T perpendicular to the other two (pitch of the satellite is relative to this axis).

For an aerobraking sail to be as effective as possible it must be substantially in a plane perpendicular to the axis R, although rotation about that axis is acceptable.

The satellite system of axes is an arbitrary system of axes the center of which is placed at the center of mass of the satellite and used to describe the geometry of the satellite in a simple manner. For FIG. 5, for example, for a satellite of cubic shape, a satellite system of axes has been chosen such that each axis is perpendicular to one of the faces of the satellite; here this system of axes has also been chosen so that the bisectrix of the two sails 10 and 11 is the axis z of that system of axes.

In this system of axes it is then possible to calculate the inertia matrix of the satellite as a function of its distribution of mass.

If $(x_i, y_i, z_i)$ are coordinates of a point of mass mi of the satellite, then in this satellite system of axes the inertia matrix is conventionally written as follows:

$$\bar{I} = \begin{bmatrix} -I_{Ox} & -I_{xy} & -I_{xz} \\ -I_{xy} & I_{Oy} & -I_{yz} \\ -I_{xz} & -I_{yz} & I_{Oz} \end{bmatrix} =$$

-continued $$\begin{bmatrix} \sum_i m_i(y_i^2+z_i^2) & -\sum_i m_i x_i y_i & -\sum_i m_i x_i z_i \\ -\sum_i m_i x_i y_i & \sum_i m_i(x_i^2+z_i^2) & -\sum_i m_i y_i z_i \\ -\sum_i m_i x_i z_i & -\sum_i m_i y_i z_i & \sum_i m_i(x_i^2+y_i^2) \end{bmatrix},$$

The satellite principal system of axes, which includes points with coordinates (X, Y, Z) is obtained by seeking the principal directions of the inertia matrix of the satellite. In this system of axes, which is deduced from the satellite system of axes by a rotation, the inertia matrix at the center of mass of the satellite is a diagonal matrix of the following type:

$$Id = \begin{bmatrix} I_X & 0 & 0 \\ 0 & I_Y & 0 \\ 0 & 0 & I_Z \end{bmatrix}$$

The inertia values $I_X$, $I_Y$, $I_Z$ are generally different and can therefore be classified according to their value $I_{minimum} < I_{intermediate} < I_{maximum}$.

Considering the above diagonal inertia matrix Id of the satellite in the satellite principal system of axes, the known condition for gravity gradient stabilization of the attitude of the satellite is reflected in the fact that:

the axis of the inertial principal system of axes for which the inertia value is $I_{intermediate}$ is aligned with the axis R of the local orbital system of axes;

the axis of the inertial principal system of axes for which the inertia value is $I_{maximum}$ is aligned with the axis T of the local orbital system of axes;

the axis of the inertial principal system of axes for which the inertia value is $I_{minimum}$ is aligned with the axis L of the local orbital system of axes.

In other words, because of the effect of the gravity gradient, the satellite has tipped until it has reached the stable position indicated above.

The gravity gradient therefore produces a restoring torque toward a stable attitude position of the satellite. Oscillations about the equilibrium position being naturally damped and dissipated by the flexible appendages (masts, sails), sloshing of the residual fluids in the tanks and atmospheric friction.

As shown in FIG. 5, the satellite 100 includes two coplanar masts 10, 11 at an angle α to a straight line segment 12 perpendicular to a plane P of placement of the masts on the satellite; the straight line segment 12 is the bisectrix of the angle between the two masts 10 and 11.

The present invention causing the gravity gradient stable position and the aerodynamic stable position to coincide, the loss of efficacy linked to changes of attitude of the satellite depending on the altitude and to a lack of stability is avoided.

The parameters that can be adjusted for the masts 10, 11 are the angle α: angle of deployment of the mast relative to the vertical to the plane of placement of the mast on the satellite, the length L of the masts, the mass m at the mast ends producing the gravity gradient.

Figure 6A:
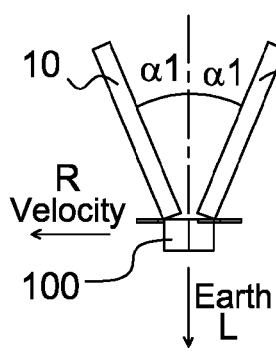
FIGS. 6A to 6C: views of satellites in gravity gradient stabilized positions according to three ranges of angles at high altitude.
Figure 6B:
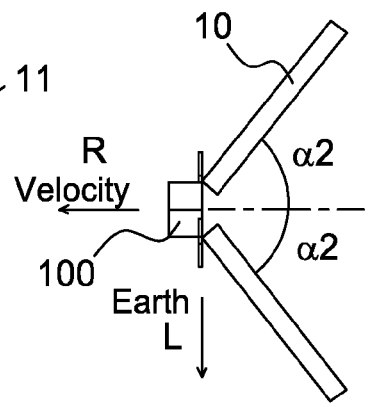
Figure 6C:
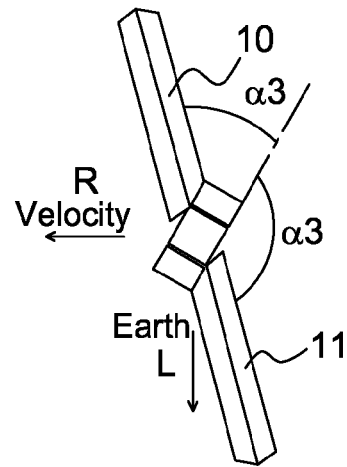

With the given inertia values of the satellite, as a function of the angle α, the length of the masts and the mast end mass, it is possible to obtain three stable configurations of the satellite. Referring to FIGS. 6A to 6C, three ranges of deployment angles of the masts correspond to three gravity gradient stabilized positions at high altitude:

the position from FIG. 6A, first angle range α1 for which the masts are oriented upward in the direction opposite the direction DT of the center of the Earth;

the position from FIG. 6B, second angle range α2 for which the masts are oriented in a direction opposite the direction V of movement of the satellite, the plane containing the masts being oriented in the direction DT of the Earth; and the position from FIG. 6C, third angle range α3 with the masts in a plane inclined relative to the direction V of movement of the satellite and relative to the direction DT of the center of the Earth.

Figure 6D:
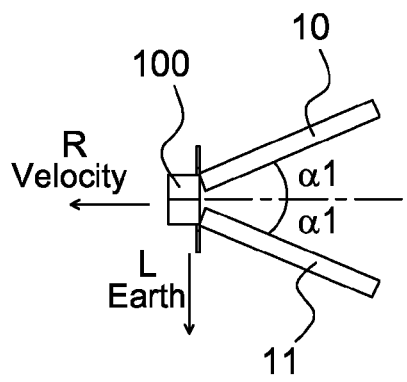
FIGS. 6D to 6F: views of satellites in aerobraking stabilized positions according to the three ranges of angles from FIGS. 6A to 6C at low altitude.
Figure 6E:
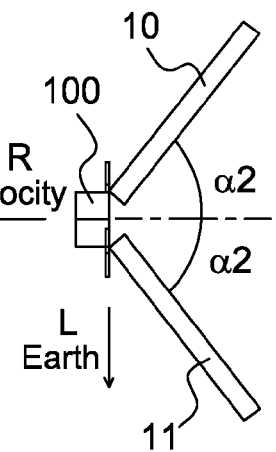
Figure 6F:
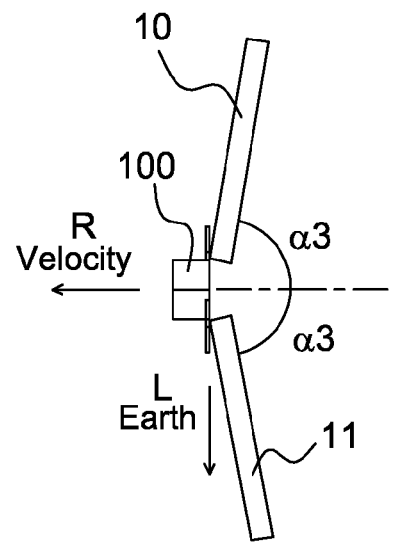

Referring to FIGS. 6D to 6F, at low altitude, because of the aerodynamic braking, three new stable positions are obtained. In FIGS. 6D to 6F the masts are oriented toward the rear of the satellite relative to its direction of movement.

It is seen that only the second range, FIG. 6B, can ensure a stable position at high altitude, identical to the aerodynamic position, FIG. 6E, the other two ranges leading to tipping between the gravity stabilized regimes of FIGS. 6A, 6C and the aerodynamic stabilization regimes of FIGS. 6D and 6F, respectively.

For a given mast length and a given satellite inertia, and if it is well chosen, the angle α therefore makes it possible to achieve coincidence of the aerodynamic and gravity gradient regimes.

The length L of the masts makes it possible to fix the deployed aerodynamic area and the gravity gradient torque.

The mass m at the end of the mast makes it possible to adjust the gravity gradient torque stabilizing the attitude of the satellite.

Figure 5A:
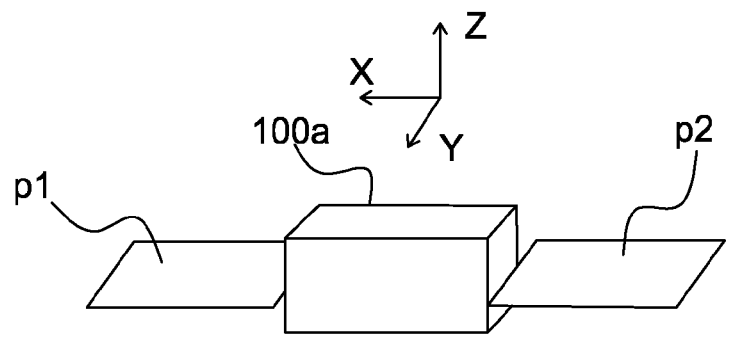
FIG. 5: a diagram showing a satellite according to the invention.

Considering a typical satellite 100a of the Myriad class represented diagrammatically in FIG. 5A and the dimensions and the masses of which constitute a parallelepiped-shape body 1 m×1 m×0.6 m including two small solar panels p1, p2 0.6 m×1 m, a mass of 183 kg, but with no aerobraking sails, the inertial principal axes X, Y, Z are approximately as shown with the axis X in the direction of the solar panels, the axis Z perpendicular to the plane containing said panels and the axis Y perpendicular to the other two.

In this system of axes the principal inertia matrix of the satellite is then as follows:

$$I = \begin{bmatrix} 19 & & \\ & 31 & \\ & & 58 \end{bmatrix} kg \cdot m^2$$

In this case, because of the effect of the gravity gradient, the stable position of the satellite is not that with the axis z aligned with the axis R, but that with the axis y aligned with the axis R, and the two solar panels have no aerodynamic braking effect.

Figure 5B:
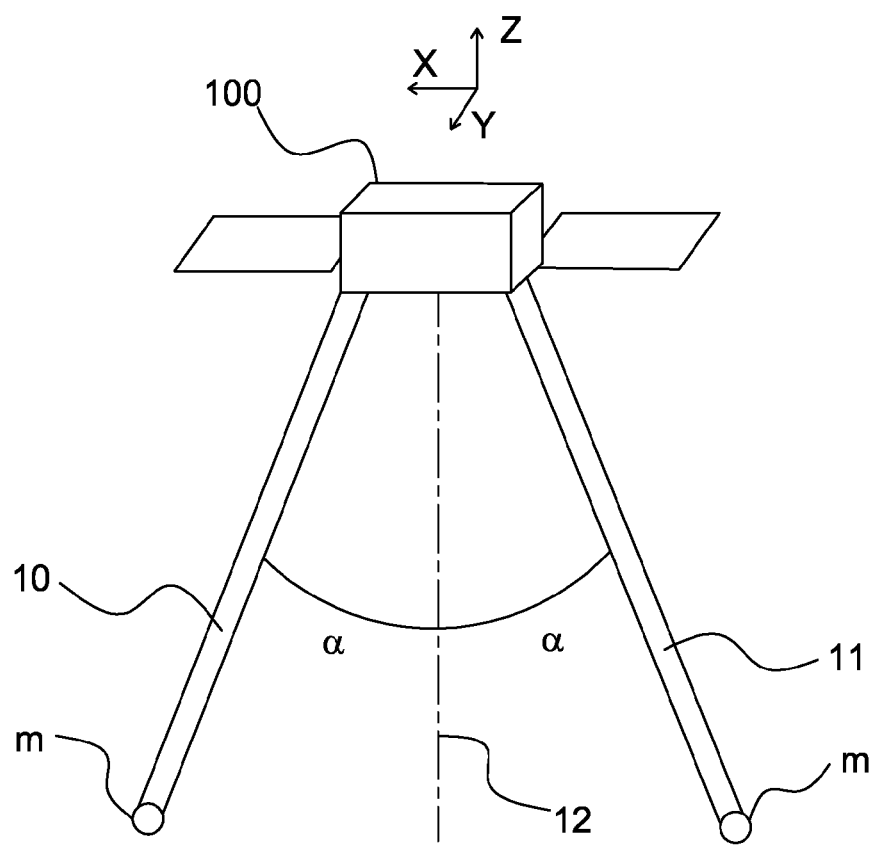

Consider now a satellite 100 according to the invention including two masts 10, 11, as indicated in FIG. 5B, 4.90 m long, each carrying a mass m of 1.8 kg at its free end and each carrying a 600 g sail 4.9 m long and 0.6 m wide.

Different positions of equilibrium in the local orbital system of axes are distinguished on varying the angle α of deployment of the masts relative to the bisectrix 12 between the masts along the axis Z.

| | α = 20° | α = 47.5° | α = 80° |
|---|---|---|---|
| Satellite principal system of axes inertia | 118<br>146<br>81 | 78<br>157<br>134 | 33<br>163<br>184 |

The above table gives typical inertias about the satellite axes for different values of angle α in the satellite principal system of axes. That principal system of axes suffers a rotation about the axis z relative to the geometrical system of axes from FIG. 5A because of the aerobraking sails. This rotation in roll relative to the trajectory of the satellite is ignored in the calculations because it is not a problem in relation to braking the satellite.

This table shows that there are three possible situations at high altitude:

For a low angle α, it is the axis X of the satellite that is parallel to the velocity axis of the satellite on its trajectory, axis R in FIG. 4;

For an intermediate angle, it is the axis Z that is parallel to the axis R;

For a high angle, it is axis Y that is parallel to the axis R.

More comprehensive calculations show that it is possible at high altitude to identify three types of attitude of the satellite depending on the deployment angle α. These attitudes are shown diagrammatically in FIGS. 6A to 6C for constant mast length, value of the mass at the mast end and sail area.

As indicated above, for their part FIGS. 6D to 6F represent, under the same conditions, the attitude of the satellite at low altitude because of the effect of aerodynamic drag.

It emerges from the calculations that two angle values $\alpha_1$ and $\alpha_2$ therefore define ranges that lead to three different behaviors of the satellite with its sails:

For $\alpha < \alpha_1$: There is tipping of the satellite on entering the aerodynamic regime according to FIGS. 6A and 6D;

For $\alpha \leq \alpha_2$: The satellite will maintain the same stable attitude at high and low altitude according to FIGS. 6B and 6E;

For $\alpha_2 \leq \alpha$: The satellite will be reoriented relative to the yaw axis according to FIGS. 6C and 6F.

For the above satellite data, $\alpha_1 = 33°$, $\alpha_2 = 62°$.

The angle of inclination of the masts relative to their bisectrix is therefore chosen between $\alpha_1$ and $\alpha_2$ (33° and 62° for the satellite of this example), which makes it possible to make the gravity gradient position at high altitude coincide with the aerodynamic position at low altitude by optimizing this angle, because the larger the angle the greater the aerodynamic area presented.

Finally, and in the case of the satellite from the chosen example, an angle of deployment of the masts of 47.5° has been adopted that makes it possible to ensure a margin of robustness in the face of inertia uncertainties.

The effective aerodynamic area in the equilibrium position is then 6.94 m². Compared to the prior art solution which, for the same "Myriad" family satellite, the same additional mass and identical masts and membranes, is not stabilized in attitude and has a mean aerodynamic area of only 5.1 m², the invention makes it possible to increase the aerodynamic area of the satellite by 36% without increasing the onboard mass.

Figure 7:
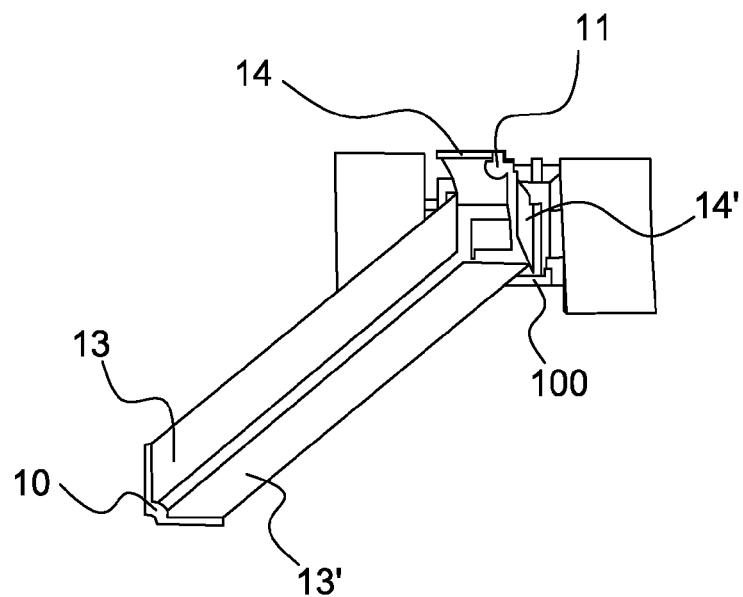
FIG. 7: a rear view of the satellite in its direction of movement.
Figure 8:
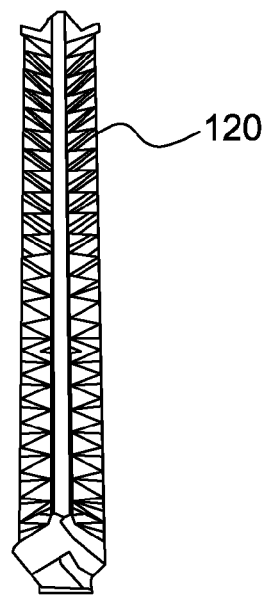
FIG. 8: a view of one embodiment of a mast useable in the invention.

FIG. 7 shows the stabilized satellite 100 with its masts 10, 11 and the panels 13, 13', 14, 14' deployed. The panels are provided in known manner by membranes and form aerobraking sails. In this Figure the satellite is seen from behind relative to its trajectory. The production of the deployment masts and the aerobraking membranes is based on inflatable masts, for example polyimide-aluminum laminate masts 120 that are stiffened by an increase in pressure as shown in FIG. 8. The architecture of the aerobraking system is made up of two masts 10, 11 and four aerobraking membranes 13, 13', 14, 14': each sail is optimized to take into account any oscillations of the satellite about the axis z.

This type of deorbiting system can be installed for deorbiting purposes on any LEO satellite at an orbit below 850 km because above that altitude the atmosphere is too tenuous to slow the satellite sufficiently, necessitating an active device to bring it down in a time compatible with space requirements.

It is also clear that for each satellite the angles α1 and α2, the length of the masts, the masses at their end, the area of the sails must be adapted using calculations such as those described above.

The method for determining the dimensions of the masts, the masses m and the angle α of the invention is as follows:
  Known trajectory calculation tools such as by way of nonlimiting example the Stella tool from ONES (Centre National des Etudes Spatiales, France) are used to determine a minimum effective area of the sail, i.e. the projection perpendicular to the trajectory of the aerobraking sail necessary and sufficient to enable deorbiting of the satellite within a chosen time; this time is 25 years maximum according to the laws and codes of good practice in this field;
  When this area has been determined, it is divided between two coplanar masts of length L with an angle 2α between them;
  A mass m is disposed at the end of each mast;
  The pair of masts is placed at an arbitrary location on the satellite;
  A satellite system of axes is chosen such that its axis z is the bisectrix of the angle between the two masts;
  The inertia matrix of the satellite is calculated and then diagonalized;
  The approach is reproduced by successive iterations that vary the location for installation of the masts, their length, the masses m and the angle α, so that:
    a—The axis Z of the satellite principal system of axes is also the bisectrix of the masts;
    b—The inertia $I_Z$ in that system of axes has the intermediate value $I_{intermediate}$;
  Values of the masses m, the mast lengths and the angle α are chosen that make it possible to minimize the total mass of the sails whilst ensuring a certain robustness of the solution, i.e. that small variations of the parameters about the values adopted do not change the attitudes of the satellite with its sails.

Under these conditions, according to the method of the invention, the axis Z is aligned with the velocity vector of the satellite both at high altitude by the action of the gravity gradient and at low altitude by the action of the aerodynamic force applied to the sails.

The method of the invention is not limited to the calculations and characteristics of the satellite given by way of example and may notably be applied to satellites up to 500 kg in low Earth orbit (LEO).

The invention claimed is:

1. A satellite stabilization and deorbiting device to stabilize and deorbit a satellite, comprising a pair of coplanar masts, each coplanar mast carrying at least one membrane to form an aerobraking sail, said coplanar masts are fixed to the satellite along non-parallel axes, said coplanar masts form a fixed angle, a first end of each coplanar mast is fixed to the satellite, and a second end of said each coplanar mast is provided with a mass, the fixed angle and each mass being configured to generate a gravity gradient resulting in a restoring torque for aligning a bisectrix of the fixed angle with a satellite velocity vector at any altitude.

2. A satellite comprising the satellite stabilization and deorbiting device as claimed in claim 1, wherein the bisectrix between the two coplanar masts carrying the aerobraking sails is an axis of a satellite principal system of axes of an inertia matrix of the satellite; and wherein an inertia $I_z$ along the bisectrix is between inertia values on other two axes of the satellite principal system of axes.

3. The satellite stabilization and deorbiting device as claimed in claim 1, wherein said each coplanar mast carries two membranes in a form of panels disposed in a V to form the aerobraking sails.

4. The satellite stabilization and deorbiting device as claimed in claim 3, wherein the panels are rectangular panels, one of longer sides of each rectangular panel is fixed to said each coplanar mast.

5. The satellite stabilization and deorbiting device as claimed in claim 3, wherein an angle between the panels on a same coplanar mast is between 70 to 110°.

6. The satellite stabilization and deorbiting device as claimed in claim 3, wherein the V has a same orientation for the two coplanar masts.

7. A method of sizing the coplanar masts, and determining masses m and an angle α of the satellite as claimed in claim 2, comprises steps of:
  determining, by trajectory calculation tools, a minimum effective aerobraking sail area to deorbit the satellite in a predetermined time;
  dividing the minimum effective aerobraking sail area across said two coplanar masts of length L with an angle 2α between said two coplanar masts;
  placing a mass m at an end of each coplanar mast;
  positioning said two coplanar masts at an arbitrary location on the satellite;
  selecting the satellite principal system of axes such that its axis Z is the bisectrix of an angle between said two coplanar masts;
  calculating and diagonalizing the inertia matrix of the satellite;
  reproducing an approach by successive iterations that varies installation locations of said coplanar masts, the lengths of said coplanar masts, the masses m and the angle α, so that:
    the axis Z of the satellite principal system of axes is also the bisectrix of said coplanar masts; and
    the inertia $I_Z$ on the axis Z of the satellite principal system of axes has an intermediate value between a minimum value and a maximum value on the other two axes of the satellite principal system of axes; and
  selecting values of the masses m, the lengths of said coplanar masts and the angle α that minimizes a total mass of the aerobraking sails while maintaining robustness of the selected values, such that variations of parameters around the selected values do not change attitudes of the satellite with the aerobraking sails.

* * * * *